(12) United States Patent
Li et al.

(10) Patent No.: US 10,084,169 B2
(45) Date of Patent: Sep. 25, 2018

(54) COATED SEPARATOR WITH COMPRESSIBLE ELASTICITY, THERMAL SHUTDOWN AND HIGH TEMPERATURE RESISTANCE

(75) Inventors: Xin Li, Tianjin (CN); Jianhua Li, Tianjin (CN); Wei Chen, Tianjin (CN); Yongjun Jiao, Tianjin (CN); Long Li, Tianjin (CN); Xinjian Deng, Tianjin (CN)

(73) Assignee: TIANJIN DG MEMBRANE CO., LTD., Tianjin (CN)

( * ) Notice: Subject to any disclaimer, the term of this patent is extended or adjusted under 35 U.S.C. 154(b) by 470 days.

(21) Appl. No.: 14/443,391

(22) PCT Filed: Nov. 1, 2011

(86) PCT No.: PCT/CN2011/081631
§ 371 (c)(1),
(2), (4) Date: May 17, 2015

(87) PCT Pub. No.: WO2013/044545
PCT Pub. Date: Apr. 4, 2013

(65) Prior Publication Data
US 2016/0197327 A1    Jul. 7, 2016

(30) Foreign Application Priority Data
Sep. 30, 2011   (CN) .......................... 2011 1 0291522

(51) Int. Cl.
*H01M 2/16*    (2006.01)
*H01M 2/14*    (2006.01)
*H01M 2/18*    (2006.01)
*H01M 10/0525*    (2010.01)
*H01M 10/42*    (2006.01)

(52) U.S. Cl.
CPC ......... *H01M 2/1686* (2013.01); *H01M 2/145* (2013.01); *H01M 2/166* (2013.01); *H01M 2/1653* (2013.01); *H01M 2/18* (2013.01); *H01M 10/0525* (2013.01); *H01M 10/4235* (2013.01); *H01M 2220/30* (2013.01)

(58) Field of Classification Search
CPC ...... H01M 2/145; H01M 2/18; H01M 2/1686; H01M 2/1653
See application file for complete search history.

(56) References Cited

U.S. PATENT DOCUMENTS 5,631,100 A * 5/1997 Yoshino ................ H01M 2/348
429/217
2008/0118827 A1 * 5/2008 Call ........................ B29C 47/20
429/129

(Continued)

FOREIGN PATENT DOCUMENTS

JP    2003-105123    *  4/2003    .............. H01M 2/16

*Primary Examiner* — Osei K Amponsah
(74) *Attorney, Agent, or Firm* — Matthias Scholl, PC; Matthias Scholl

(57) ABSTRACT

A lithium ion battery separator consists of a PE micro-porous substrate A and a micro-porous coating B which is located on the substrate A and formed of mixing pre-crosslinked rubber particles and ceramic fine powder composite materials. The separator has characteristics of good compressible elasticity, thermal shutdown, low heat shrinkage, high temperature membrane rupture resistance and so on.

10 Claims, 2 Drawing Sheets

(56) References Cited

U.S. PATENT DOCUMENTS

2010/0323230 A1\* 12/2010 Lee ...................... H01M 2/166
429/143
2011/0027660 A1\* 2/2011 Takeda ...................... C08J 5/18
429/254

\* cited by examiner

COATED SEPARATOR WITH COMPRESSIBLE ELASTICITY, THERMAL SHUTDOWN AND HIGH TEMPERATURE RESISTANCE

CROSS-REFERENCE TO RELATED APPLICATIONS

This application is a National Stage Appl. filed under 35 USC 371 of International Patent Application No. PCT/CN2011/081631 with an international filing date of Nov. 1, 2011, designating the United States, and further claims priority benefits to Chinese Patent Application No. 201110291522.8 filed Sep. 30, 2011. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to a lithium ion battery membrane, and more particularly to a high performance coated membrane for power batteries. The coated membrane features excellent compressible elasticity, thermal shutdown, low thermal shrinkage, and high temperature resistance, which are favorable to the improvement of the safety and cycle performance of lithium ion batteries.

Description of the Related Art

Polyolefin microporous membrane has nano micropores (having an average pore size of less than 300 nm, a porosity of 30-65%, and a normal thickness of 16, 20, and 25 μm) in the form of a penetrable three dimensional network and features high voltage oxidation resistance and stability in organic electrolytes of lithium ion batteries. As a membrane material, the polyolefin microporous membrane has been widely applied to batteries of cell phones and laptops. Typical commercial polyolefin microporous membranes include: a three-layer of PP/PE/PP composite membrane prepared by a dry method, and a single layer of PE membrane having a large molecule weight prepared by a wet method. Including the polyolefin microporous membrane, the two membranes feature proper thermal shutdown temperature, which can satisfy the requirement of the lithium ion batteries for the electronic products. However, the membrane for the power battery is much strictly required. For pore size control, the membrane should have reasonable nanoscale pore size, highly uniform pore size distribution, relatively high porosity, and uniform distribution; in the mechanical aspect, the membrane should have relatively high toughness and tensile strength in the transverse direction and excellent compressible elasticity in the thickness direction, and high compression resistance and local acupuncture strength; in the aspect of the electrical property, the membrane is required to have high insulation breakdown voltage and low ion impedance; and in the thermal performance, the membrane is required to have stable size at high temperatures, low thermal shrinkage, shutdown property, and high temperature rupture resistance. Besides, the membrane is also required to have excellent electrolyte wettability, and improved imbibition and solution retention capacities.

The current commercialized uniaxially stretched membrane prepared by the dry method presents the following shortages when applied to the power battery:

1. The membrane has deficient toughness, and a transverse elongation at break thereof is less than 25%, thereby being easily torn in the transverse direction.
2. Although the middle microporous layer employs PE that has the shutdown temperature of 135-145° C., large thermal shrinkage and membrane rupture at high temperature resistance still exist in the membrane at the temperature of above 120° C.
3. Compressible elasticity and stress absorbency are deficient in the thickness direction.

To improve the transverse rupture resistance of the PP/PE/PP membrane prepared by the dry method, Chinese patent publication number CN 02152444.0 discloses a method including blending less than 10 wt. % of thermoplastic polyolefin elastomers, i. e., ethylene propylene monomer (EPM) and ethylene propylene diene monomer (EPDM), into a polyolefin matrix, and stretching a resulting mixture to produce pores. However, the nature of the thermoplastic polyolefin elastomers determines the formation and distribution of crazes in the polyolefin matrix during the cold stretching, that is, the capability of pore-formation through stretching polyolefin matrix using the dry method is influenced, and the proper porosity cannot be obtained. Thus, the proportion of the added thermoplastic polyolefin elastomers must be as small as possible. As a result, the elastic property is improved slightly, resulting in low applicability.

To improve the uniaxially stretched membrane prepared by the dry method, Asahi Kasei, Tonen Chemical, and other companies have adopted thermally induced phase separation to develop the biaxially stretched nano microporous membrane having high molecular PE prepared by the wet method since 1990s. The raw materials for the membrane generally have a weight average molecular weight of above 500000, and the membrane prepared by the wet method has obviously improved transverse tensile strength and elongation at break compared with the membrane prepared by the dry method. However, the current PE membrane prepared by the wet method applied to the power battery has the following shortages:

1. The membrane has relatively large thermal shrinkage at above 120° C. and deficient high temperature rupture resistance.
2. The membrane also lacks absorbency in the thickness direction and cannot satisfy the high requirements on the security and the cycle life of the power battery.

Chinese patent application numbers 200680035668.3, 200780005795.3, and 200510029794.5 also disclose the co-extruded membrane preparation in the polyolefin composite membrane prepared by the wet method, which primarily include regulating the solid content of the polyolefin raw material and the polyethylene/polypropylene ratio and controlling the molecular weights of raw materials for different layers to obtain different interlayer porosities, pore size distributions, and melt points of different membrane layers. However, such co-extruded composite membranes have defects in improving the membrane rupture at high temperature, the compression resistance, and the resilience of the membrane.

In addition to the polyolefin microporous membrane, there is a microporous physical gel membrane prepared by the solvent-induced phase separation method, such as the PVDF-HFP copolymer microporous physical gel membrane prepared by Bellcore process. The microporous physical gel membrane when in use is cohered to pole pieces by hot pressing process to form integral pole pieces. The PVDF-HFP porous membrane after imbibition ensures uniform distribution of the electrolyte between the pole pieces. The gel membrane is also superior to the non-polyolefin membrane in compressible elasticity, imbibition, and solution retention capacity, and the cycle life of the prepared polymer battery is relatively long at low temperature and the room temperature. However, the copolymer is partially dissolved at 60° C. and the cycle life of the battery is poor at the high temperature. Besides, the PVDF-HFP copolymer gel membrane has slightly larger average pore size, approximately 0.3-2 μm, and low mechanical strength. The microporous gel membrane cannot adopt the hot stretching strengthening process that is commonly used for the polyolefin microporous membrane and is inadaptable to highly efficient battery rolling process. Even lamination process is adopted, it is also required to improve the thickness (generally designed to be 50-70 μm) of the membrane to prevent the short circuit of the battery. The larger the thickness of the membrane is, the larger the resistance of the electrolyte between the positive pole piece and the negative pole piece is, which is not beneficial for the rate capability and the energy density of the battery. Due to the high production cost and the limit energy density of the membrane, the membrane has not been widely applied to the lithium ion batteries but only a small amount of them are applied to special technical fields.

To improve the high temperature shrinkage resistance and the high temperature rupture resistance of the current polyolefin microporous membrane, Chinese patent application numbers 200880003493.7, 200880000072.9, and 201010022936.6, and LG Chem disclose technical solutions including coating microporous ceramic coating layer on the surface of the polyolefin microporous membrane to form a composite membrane. The composite membrane is capable of bearing penetration of the thermocauter at 200° C. Some foreign lithium ion companies adopt the method of coating the ceramic layer on the surface of the membrane to improve the high temperature shrinkage property and the high temperature rupture resistance, and such method are specifically introduced in U.S. Pat. No. 7,892,673 B2, U.S. Pat. No. 6,447,958 B1, U.S. Pat. No. 7,883,799 B2, and U.S. Pat. No. 6,432,586. $Al_2O_3$ is the most common inorganic ceramic material, and the membrane surface after coating such inorganic ceramic material has improved thermal shrinkage and rupture temperature. However, compressible elasticity and solution retention capacity of the ceramic coated membrane are not good, and the cycle performance of the battery is not obvious improved. In addition, the ceramic coating lacks flexibility and cannot be too thick, and the coating layer is easily separated from or peeled off the membrane in practical production and application.

Asahi Kasei also announced that they successfully developed the inorganic hybrid membrane IBS with high output power application in 2008. The porosity of the membrane is increased by 50-70%, the resistance thereof is decreased to half of that of the traditional product, and the acupuncture strength thereof reaches above 4.9 N(500 gf).

Battery membrane "Separion" based on the organic substrate of non-woven fabric combined with an inorganic coating layer manufactured by Degussa Company from Germany possesses both the flexibility of the organic compound and the thermal stability of the inorganic ceramic, and the high temperature resistance thereof reaches 200° C. In the charging-discharging process of the battery, even the organic substrate melts, the inorganic coating layer remains the integrity of the membrane so as to prevent large area short circuit, and such an organic/inorganic composite membrane provides an operable solution for the high temperature resistance of the membrane. But the non-woven fabric has large pore size, and the short circuit and self-discharging phenomenon are serious, and besides, such organic/inorganic composite membrane does not have the high strength and proper thermal shutdown temperature specially possessed by the polyolefin microporous membrane, thereby resulting in poor security of the battery.

Chinese patent application number 200510086061.5 discloses a technical solution for preparing a microporous coating layer on the surface of the polyolefin microporous membrane using high temperature resistant polyamide, polyamideeimide, polyimide having melt points of exceeding 180° C. Chinese patent application number 200480034190.3 proposes a technical solution including coating a gelled fluororesin on the surface of the polyolefin microporous membrane to form the coating layer. The technical solutions also have the same shortages as the ceramic coated membrane, which are specifically as follows: 1. Because the current polyolefin membrane basically belongs to the inert material, the bonding force of the polyolefin membrane to the coating layer is not enough, too thick coating results in easy separation from the membrane, and too thin the coating inhibits the thermal shrinkage function of the polyolefin membrane. 2. Capillary action exists in the micropores of the polyolefin membrane. The gel in the slurry easily enters the micropores of the polyolefin membrane when coating the composite membrane, which may affect the pore size distribution of air permeability of the membrane after solvent evaporation, desiccation, and formation of the membrane. The consistency of the membranes produced in batches using the coating method is difficult to control, and the production costs thereof are high.

All the above are about formation of a high temperature resistant coating layer on a polyolefin microporous membrane using the coating method. In contrast to the technology of coating the ceramic layer on the membrane surface, Matsushita from Japan and other companies have proposed a technical route of coating the ceramic layer on the surface of the negative pole piece of the battery so as to avoid the shortages existing in preparation of the high temperature resistant microporous ceramic coating layer on the polyolefin membrane surface. The Matsushita company has tried to coat the $Al_2O_3$ microporous coating layer having a thickness of 1-2 μm on the surface of the negative pole piece surface of the electrical core 18650 having a capacity of 2600 mAh and put into production and application in batches since 2007 after the Sony laptop battery accident. However, the pole piece is relatively thick, the load for drying the coating is large, the length of each reel in practical production is limited, and the production cost is relatively high. Besides, the ceramic coating layer does not possess the compressible elasticity and the improvement in the cycle life of the battery is not obvious.

Yang Li, Wang baofeng, et al., from Shanghai Jiaotong University have proved from experiments that periodic changes occurs in the volume and pressure of the graphite anode materials during the charge and discharge processes. Chines patent application numbers 200680010010.7, 200680010890.8, 200680010912.0, and 200680031471.2 disclose technical solutions for regulating the hot stretching. However, the compressible elasticity of the membrane is insufficiently improved, and the membrane has a certain thickness change rate only in conditions of high compressive stress and high temperature 2.2 megapascal/90° C., which cannot satisfy the practical application requirements of the battery. Generally, the compressive stress between the pole piece and the membrane does not exceed 0.7 megapascal. Except the high temperature of 85-90° C. is used for dehydration before the injection of the battery, a normal service temperature of the battery is between −20 and +60° C. Thus, the membrane is required to adapt to the compressible elasticity in normal charging-discharging conditions within a normal service temperature range.

To overcome limitations of the product and the technology of the existing membrane, a technical solution is proposed in the invention that a coated membrane is prepared by coating composite material of ceramic powder and the rubber particles on one side of the polyolefin PE microporous membrane. The ceramic powder and the pre-crosslinked rubber particles are combined together by an aqueous adhesive to form the coating layer on the PE membrane. The microporous membrane based on the high-density polyethylene (HDPE) having different pore sizes on two sides and being biaxially stretched and strengthened is used as the substrate of the coated membrane. The coating layer is coated on the side of the substrate having larger pore size, thereby being beneficial for improving the adhesive strength between the coating layer and the substrate. The PE substrate of the coated membrane has a proper thermal shutdown temperature of 125-145° C., and a stretched and strengthened PE substrate has high mechanical performance. As the coating layer material has proper compressible elasticity, thermal shrinkage resistance at high temperature, high temperature rupture resistance, and fast imbibition, the coated membrane with complementary functions is adapted to requirements of high security, high cycle life of the lithium ion battery. The rubber particles having pre-crosslinked submicron particle size are utilized as the coated membrane as the raw material. The rubber particle mainly enhances the imbibition and the compressible elasticity, and further inhibits the high temperature shrinkage and high temperature rupture phenomenon of the PE substrate together with the ceramic powder. The rubber latex is used as the raw material and treated with irradiation crosslinking so as to obtain the pre-crosslinked rubber particles having controllable particle sizes in the aqueous solution, thereby preventing the second agglomeration and particle enlargement existing in the rubber powder prepared by atomized drying and meanwhile making the coating layer have uniform nanoscale thickness. Post-crosslinked rubber has imbibition property in the proper organic solvent and is superior to the non-crosslinked rubber in compressible elasticity. The ceramic powder is adopted by the coating layer as a separator for separating the rubber particles, thereby preventing the rubber particles from forming impermeable rubber layer. The ceramic powder existing in the coating layer also inhibits the high temperature thermal shrinkage and high temperature rupture of the PE substrate. The rubber particles and the ceramic powder adopt the aqueous adhesive to form the composite coated membrane based on the PE microporous membrane, such a coated membrane has complementary functions, simple process, uniform thickness, and low production cost. The coated membrane prepared by the technical route of the invention possesses the above characteristics and enables the power battery to have significantly improved security and cycle performance. The coated membrane also has controllable production cost in large-scale production and strong market competitiveness.

SUMMARY OF THE INVENTION

In accordance with one embodiment of the invention, there is provided a coated membrane with characteristics of compressible elasticity, thermal shutdown, and high temperature resistance. The coated membrane comprises at least a PE-based microporous substrate A and a composite material-based microporous coating B which is coated on one side of the PE-based microporous substrate A. The PE-based microporous substrate A is mainly composed of high density polyethylene with a weight average molecular weight of more than 800,000, and low density polyethylene is also acceptable to be mixed with the high density polyethylene. High molecular weight results in high molecular entanglement density, thereby ensuring the tensile strength and elongation at break of the microporous substrate. In addition, high density polyethylene exhibits thermal shutdown property at 125-145° C. An ester plasticizer, for example, dioctyl terephthalate, is mixed and casted with high density high density polyethylene, based on the principle of a liquid-liquid phase separation method of thermally induced phase separation technology and by cooling two sides of a melt with different cooling rates, to yield a sheet with different phase states at two sides thereof, which is two-way hot stretched and extracted to yield high-strength PE-based microporous substrate with different pore sizes at two sides. Preferably, an average pore size $D_{coating}$ of a to-be-coated side of the PE-based microporous substrate A prior to coating is between 100 and 1000 nm, particularly between 100 and 800 nm, which is conducive to the part penetration of the aqueous slurry into the substrate, thereby improving the bonding strength of the coating and the substrate. Too much large pore size will reduce the mechanical properties of the membrane. The average pore size of the non-coated side of the substrate is preferably between 50 and 150 nm Appropriate small pore size can effectively prevent the internal short circuit of the battery thereby avoiding too fast self-discharge, while too small pore size affects the internal resistance of the battery. Preferably, the PE-based microporous substrate has a thickness Ta of between 9 and 35 μm, a porosity of between 35 and 80%, a longitudinal tensile strength of more than 70 megapascal, and a transverse elongation at break of more than 100%. If the substrate is too thin or the porosity is too large, the tensile strength of the coated membrane will be deficient, which is unfavorable to the automatic winding of the batter, and the acupuncture strength is also deficient, and the internal short circuit tends to occur in the battery. If the substrate is too thick or the porosity is too small, the internal resistance of the battery will be big. The transverse elongation at break of more than 100% is favorable to the security of the battery. In case the battery is squeezed, the membrane is not easy to crack.

The composite material-based microporous coating B comprises pre-crosslinked rubber particles, ceramic micropowders, and a water-soluble polymer binder, and has a thickness $T_b$ of between 2 and 25 μm. The pre-crosslinked rubber particles can enhance the compressible elasticity and the liquid absorbability and swelling capacity of the coated membrane. The pre-crosslinked rubber particles employ rubber latex as a raw material. The rubber latex is irradiated and crosslinked in its emulsion state. The crosslinked rubber latex is, free from drying, directly mixed in the emulsion state with the ceramic micropowders and the water-soluble polymer binder, and then dispersed uniformly. As a result, the growth of the secondary agglomerated particles resulting from the spray drying or furnace drying is prevented. Large particle size of rubber powders is not favorable to the precise coating. The pre-crosslinked rubber particles account for between 15 and 60 wt. % of the three components of the microporous coating, particularly between 30 and 50 wt. %. Too low content of rubber particles is unfavorable to the elasticity of compression, and too high content of rubber particles causes poor air permeability thereby affecting the power characteristic of the battery. To improve the elastic resilience of the rubber particles, a glass transition temperature of the rubber particles are below minus 25° C., and to control the irradiation dose so that the gel content of the rubber particles exceeds 35%. The ceramic micropowders mainly function as an isolating agent, preventing the rubber particles and the polymer binder from shrinkage to form one body due to the capillarity in the process of moisture evaporation of the coated membrane. To ensure the electric insulation of the coated membrane, the ceramic micropowders are preferably selected with a room temperature resistivity exceeding $10^{12}$ Ω·cm. Specifically, the ceramic micropowders comprise an oxide or nitride of an element selected from Al, Si, Zr, Mg, Ti, B. To favor the slitting of the coated membrane, the ceramic micropowders are preferably hexagonal boron nitride powers having a Mohs Hardness of less than 4, a thermal conductivity of more than 30 w/m·k, and a room temperature resistivity of more than $10^{13}$ Ω·cm. To favor the high precision coating, the average particle size of the ceramic micropowders and the pre-crosslinked rubber particles is between 50 and 2000 nm, particularly between 200 and 800 nm.

The invention also provides a method for preparing the coated membrane. The method comprises: 1) irradiating and crosslinking the rubber latex whereby yielding pre-crosslinked rubber particles dispersed in an aqueous solution; 2) preparing the PE-based microporous substrate with different pore sizes at two sides using a liquid-liquid phase separation method of thermally induced phase separation technology by cooling two sides of a melt with different cooling rates; 3) adding the water-soluble polymer binder to purified water to yield a uniform transparent gel, adding to the uniform transparent gel crosslinked rubber latex, the ceramic micropowders, and a non-ionic surface active agent, or a second solvent premixed with water, whereby obtaining a mixture, dispersing and emulsifying the mixture to yield an aqueous slurry, deaerating the aqueous slurry by vacuuming; to enhance the wetting property of the aqueous slurry on the PE-based microporous substrate, performing corona treatment on the PE-based microporous substrate prior to coating, coating the uniform aqueous slurry on one side of the PE-based microporous substrate having macropores, and hot air or infrared drying the coated microporous substrate at a temperature of between 50 and 100° C., whereby forming a composite material-based microporous coating on the PE-based microporous substrate; and 4) calendaring or not calendaring, and hot pressing the coated membrane at a temperature of between 90 and 125° C. to thin the membrane by 85-100%. Thereafter, to reduce the residue stress, the coated membrane can be shaped at a temperature of between 90 and 100° C., and then cooled and wrapped up.

To ensure the effectiveness of the coated membrane when used in a lithium ion battery, the proportion of the rubber particles and ceramic micropowder, the distribution of particle size, and the thickness ratio of the coating to the substrate are all regulated appropriately. Preferably, the coated membrane has the following characteristics:

(1) The total thickness Tab is between 12 and 50 μm, the Gurley value is between 50 and 500 S/100 CC, the acupuncture strength is greater than 350 gf, the breakdown voltage is greater than 300 V; the thickness ratio of the composite material-based microporous coating B to the microporous substrate A ($T_b:T_a$) is between 0.3 and 1.5, and the peeling strength of the coating is greater than 20 gf/cm.

(2) Compressible elasticity: at a temperature of between 45 and 60° C., exert a static compressive stress of 50 pounds per square inch (PSi) on the coated membrane for one hour along a thickness direction thereof, a compression deformation of the coated membrane along the thickness direction is greater than 10% of $T_{ab}$ and less than 30% of $T_{ab}$; 15 min later upon the release of pressure, the thickness restores to more than 93% of an original thickness prior to compression; and after 500 cycles, the restored thickness is still more than 90% of the $T_{ab}$.

(3) Thermal shutdown and high temperature resistance: exert a static compressive stress of 1 PSi on the coated membrane along the thickness direction thereof, heating the coated membrane with a rate of 1° C./min from 100° C. to 200° C., a thermal shutdown temperature of the coated membrane is between 125 and 145° C.; maintain the temperature of 200° C. for 15 min, cool the coated membrane to room temperature, physical appearance of the coated membrane keeps intact, a longitudinal and transverse thermal shrinkage is less than 5%, and a Gurley value increases to exceed 2000 S/100 CC.

The rubber particles employ rubber latex as a raw material with a glass transition temperature of below minus 25° C. The rubber latex is selected from the group consisting of styrene butadiene rubber (SBR), carboxylic styrene butadiene rubber (XSBR), carboxylic acrylonitrile butadiene rubber (XNBR), carboxylic polybutadiene rubber (XBR), butadiene-styrene-vinyl pyridine rubber (PSBR), vinyl pyridine-butadiene rubber (PBR), ethylene-propylene methylene copolymer (EPM), polyisobutylene (PIB), ethylene propylene diene rubber (EPDM), isobutylene-isoprene rubber (IIR), isoprene rubber (IR), styrene-isoprene-butadiene rubber (SIBR), nitrile butadiene rubber (NBR), butadiene rubber (BR), acrylate rubber, silicone rubber, fluororubber, or a combination thereof.

To improve the bonding strength between the coating and the substrate and the cohesive strength of the coating, the water-soluble polymer binder has a weight average molecular weight of more than 50,000, particularly more than 150,000, which is selected from the group consisting of carboxymethyl cellulose (CMC), polyvinyl pyrrolidone (PVP), polyoxyethylene, polyvinyl alcohol, an adduct of polypropylene glycol and ethylene oxide, or a combination thereof; the water-soluble polymer binder accounts for between 0.5 and 8 wt. % of the three components of the composite material-based microporous coating B, particularly between 1 and 5 wt. %. Too high content of the binder tends to produce an airproof layer, and too low content of the binder affects the bonding strength between the coating and the substrate and the cohesive strength of the coating.

To enhance the bonding strength between the coating and the PE substrate, and the wettability and penetration ability of the aqueous slurry and the microporous substrate, a non-ionic surface active agent accounting for 0-1 wt. % of the aqueous slurry is added to the aqueous slurry prior to coating. The contact angle between the coating slurry and the substrate A is controlled between 20 and 75 degrees. The non-ionic surface active agent is selected from the group consisting of nonylphenol polyoxyethylene ether, octaphenyl polyoxyethyiene, high carbon ($C_{12-22}$) fatty alcohol polyoxyethylene ether, an adduct of polypropylene glycol and ethylene oxide, a non-ionic fluorocarbon surfactant, or a combination thereof.

To enhance the bonding strength between the coating and the PE substrate, and the wettability and penetration ability of the aqueous slurry and the microporous substrate, the pre-crosslinked rubber particles, the ceramic micropowders, and the water-soluble polymer binder are mixed to yield an aqueous slurry, and a second solvent which is mixed with water and then wetted with polyethylene is added to the aqueous slurry prior to coating, a weight ratio of the aqueous slurry to the second solvent being between 100:0 and 100:50. The contact angle between the coating slurry and the substrate A is controlled between 20 and 75 degrees. The second slurry is selected from the group consisting of isopropanol, butanol, N-methylpyrrolidone, N-ethylpyrrolidone, N-octylpyrrolidone, polyethylene glycol and polypropylene glycol having a molecular weight of between 200 and 800, or a combination thereof.

The coated membrane of the invention is not limited to the PE-based microporous substrate. Optically, the microporous substrate comprises two layers of microporous membrane, a first layer is a polypropylene microporous membrane, a second layer is a PE-based microporous membrane; the composite material-based microporous coating B is coated on one side of the PE-based microporous membrane having macropores.

The invention also provides a lithium ion battery, comprising a positive pole piece, a negative pole piece, a membrane, and an electrolyte. The battery employs the coated membrane, and the coated side of the coated membrane contacts the negative pole piece of the battery.

DETAILED DESCRIPTION OF THE EMBODIMENTS

Figure 1:
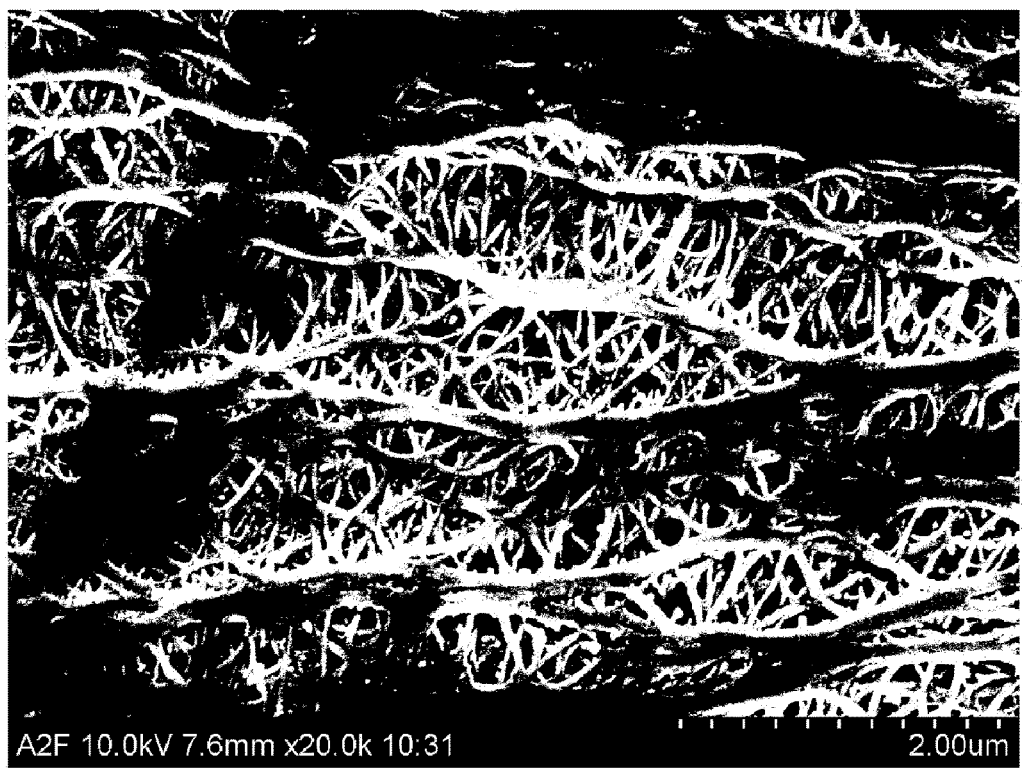
FIG. 1 is a high magnification morphology (SEM) of an ascopore side of a PE-based microporous substrate in accordance with one embodiment of the invention.
Figure 2:
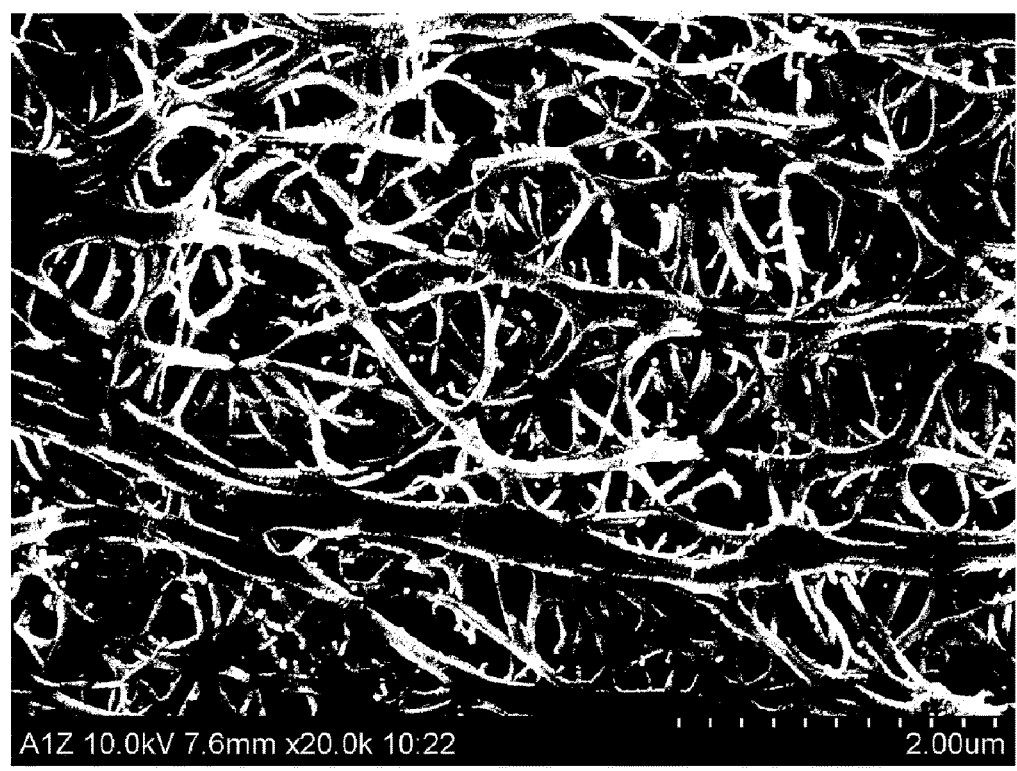
FIG. 2 is a high magnification morphology (SEM) of a macropore side of a PE-based microporous substrate in accordance with one embodiment of the invention.
Figure 3:
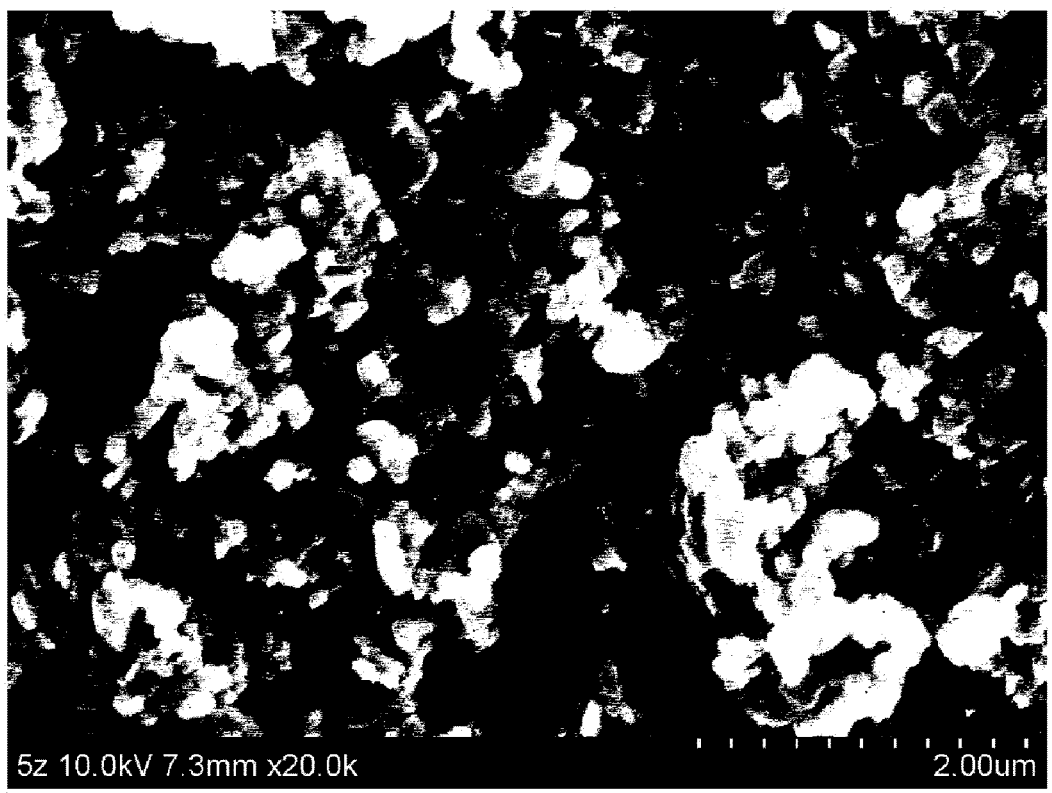
FIG. 3 is a high magnification morphology (SEM) of a PE-based microporous substrate after being coated with a rubber-ceramics composite material-based coating in accordance with one embodiment of the invention.

For further illustrating the invention, experiments detailing a coated membrane and a preparation method thereof are described hereinbelow combined with the drawings. It should be noted that the following examples are intended to describe and not to limit the invention.

Example 1

1. Preparation of Materials of a Coated Membrane
1) Preparation of a PE-Based Microporous Substrate A 18 parts by weight of polyethylene having an weight average molecular weight of 1,500,000, 60 parts by weight of dioctyl terephthalate, 22 parts by weight of paraffin oil, and 0.2 part by weight of an antioxidant 1010 were uniformly mixed at a temperature of 210-230° C. and casted. One side of the cast piece was rapidly quenched using a mirror roll, and the other side of the cast piece was air cooled. The cast piece was hot stretched along MD (machine direction) by 7 folds and TD (transverse direction) by 4 folds. The plasticizer was extracted and removed. Thereafter, the cast piece was stretched transversely by 25% to yield the PE-based microporous substrate A, with a thickness of 16-18 μm, a porosity of 50-65%, an average pore size at the side cooled by rolls was 80 nm, an average pore size at the side cooled by air was 400 nm, and a Gurley value of 150 S/100 CC.

2) Preparation of Pre-Crosslinked Rubber Particles

Styrene-butadiene latex having a solid content of 50%, primary particle size of 100-500 nm, and glass transition temperature of minus 45° C. was irradiated by 100 KGy of gamma ray, and the gel content was 75-85%.

3) Preparation of an Aqueous Slurry 1.5 parts by weight of CMC was dissolved in 200 parts by weight of purified water, and then 20 parts by weight of hexagonal boron nitride powers having a particle size of 200-800 nm, 20 parts by weight of the pre-crosslinked latex, and 3 parts by weight of PEG-400 having a molecular weight of 400 were uniformly mixed, and deaerated by vacuuming.

2. Coating

The obtained aqueous slurry was coated on the macropore side of the PE-based microporous substrate A by knife coating, stepwise dried from 50 to 90° C., and precisely calendered at 110° C. under a linear pressure of 8 kg/cm. The total thickness $T_{ab}$ of the coated membrane was 25-27 μm.

Properties of the Coated Membrane:

The Gurley value was 280 S/100 CC, the breakdown voltage was greater than 450 V, the peel strength of the coating was 60 gf/cm, the acupuncture strength was 590 g. Compressible elasticity: at 60° C., exert a static compressive stress of 50 pounds per square inch (PSi) on the coated membrane for one hour along a thickness direction thereof, a compression deformation of the coated membrane along the thickness direction is 22% of $T_{ab}$; 15 min later upon the release of pressure, the thickness restores to more than 93% of an original thickness prior to compression; and after 500 cycles, the restored thickness is still more than 90% of the $T_{ab}$; thermal shutdown and high temperature resistance: exert a static compressive stress of 1 PSi on the coated membrane along the thickness direction thereof, heating the coated membrane with a rate of 1° C./min from 100° C. to 200° C., a thermal shutdown temperature of the coated membrane is 138° C.; maintain the temperature of 200° C. for 15 min, cool the coated membrane to room temperature, physical appearance of the coated membrane keeps intact, a longitudinal and transverse thermal shrinkage is less than 4%, and a Gurley value increases to exceed 2500 S/100 CC.

Example 2

The example is basically the same as that in Example 1, except that in the preparation of the aqueous slurry, the proportion of the ceramics micropowders and the pre-crosslinked rubber is changed. Specifically, 1.5 parts by weight of CMC was dissolved in 200 parts by weight of purified water, and then 30 parts by weight of hexagonal boron nitride powers having a particle size of 200-800 nm, 10 parts by weight of the pre-crosslinked latex, and 3 parts by weight of PEG-400 having a molecular weight of 400 were uniformly mixed, and deaerated by vacuuming.

Properties of the Coated Membrane:

The Gurley value was 230 S/100CC, the breakdown voltage was greater than 450 V, the peel strength of the coating was 45 gf/cm, the acupuncture strength was 660 g. Compressible elasticity: at 60° C., exert a static compressive stress of 50 pounds per square inch (PSi) on the coated membrane for one hour along a thickness direction thereof, a compression deformation of the coated membrane along the thickness direction is 18% of $T_{ab}$; 15 min later upon the release of pressure, the thickness restores to more than 90% of an original thickness prior to compression; and after 500 cycles, the restored thickness is still more than 90% of the $T_{ab}$; thermal shutdown and high temperature resistance: exert a static compressive stress of 1 PSi on the coated membrane along the thickness direction thereof, heating the coated membrane with a rate of 1° C./min from 100° C. to 200° C., a thermal shutdown temperature of the coated membrane is 138° C.; maintain the temperature of 200° C. for 15 min, cool the coated membrane to room temperature, physical appearance of the coated membrane keeps intact, a longitudinal and transverse thermal shrinkage is less than 4%, and a Gurley value increases to exceed 2500 S/100 CC.

The invention claimed is:

1. A coated membrane, the coated membrane comprising:
at least a composite material-based microporous coating comprising a first coating side; and
a PE-based microporous substrate comprising a first substrate side and a second substrate side;
wherein:
the PE-based microporous substrate is mainly composed of high density polyethylene, and has a porosity of between 35 and 80%, a longitudinal tensile strength of more than 70 megapascal, and a transverse elongation at break of more than 100%;
an average pore size of the first substrate side is between 100 and 800 nm, and the average pore size of the first substrate side is larger than that of the second substrate side;
the composite material-based microporous coating has a thickness $T_b$ of between 3 and 25 μm, and comprises pre-crosslinked rubber particles with a gel content exceeding 35%, ceramic micropowders with a room temperature resistivity exceeding $10^{12}$ Ω·cm, and a water-soluble polymer binder;
the pre-crosslinked rubber particles account for between 15 and 60 wt. % of three components of the composite material-based microporous coating;
an average particle size of the pre-crosslinked rubber particles is between 100 and 800 nm, and an average particle size of the ceramic micropowders is between 200 and 800 nm;
the first coating side is coated on the first substrate side;
the coated membrane has the following characteristics:
(1) compressible elasticity: a total thickness $T_{ab}$ of the coated membrane is between 12 and 50 μm; at a temperature of between 45 and 60° C., when exerting a static compressive stress of 50 pounds per square inch (PSi) on the coated membrane for one hour along a thickness direction thereof, a compression deformation of the coated membrane along the thickness direction is greater than 10% of the Tab and less than 30% of the $T_{ab}$; 15 min later upon release of pressure, the thickness restores to more than 93% of an original thickness prior to compression; and after 500 cycles, the thickness restores to still more than 90% of the $T_{ab}$; and
(2) thermal shutdown and high temperature resistance: when exerting a static compressive stress of 1 PSi on the coated membrane along the thickness direction thereof, and heating the coated membrane with a rate of 1° C./min from 100° C. to 200° C., a thermal shutdown temperature of the coated membrane is between 125 and 145° C.; when maintaining the temperature of 200° C. for 15 min, and cooling the coated membrane to room temperature, physical appearance of the coated membrane keeps intact, a longitudinal and transverse thermal shrinkage is less than 5%, and a Gurley value increases to exceed 2000 S/100 CC; and
the ceramic micropowders are hexagonal boron nitride powders having a Mohs Hardness of less than 4, a thermal conductivity of more than 30 w/m·k, and a room temperature resistivity of more than $10^{13}$ Ω·cm.

2. The coated membrane of claim 1, wherein an original Gurley value of the coated membrane is between 50 and 500 S/100 CC, a breakdown voltage thereof is greater than 300 V, and a peeling strength thereof is greater than 20 gf/cm.

3. The coated membrane of claim 1, wherein the pre-crosslinked rubber particles employ rubber latex as a raw material, and the rubber latex is irradiated and crosslinked under an irradiation dose of between 30 and 300 KGy; a glass transition temperature of the rubber particles is below minus 25° C.; irradiated rubber latex is, free from drying, directly mixed in an emulsion state with the ceramic micropowders and the water-soluble polymer binder, and then dispersed uniformly; the rubber latex is selected from the group consisting of carboxylic styrene butadiene rubber (XSBR), carboxylic acrylonitrile butadiene rubber (XNBR), carboxylic polybutadiene rubber (XBR), butadiene-styrene-vinyl pyridine rubber (PSBR), vinyl pyridine-butadiene rubber (PBR), ethylene-propylene methylene copolymer (EPM), styrene butadiene rubber (SBR), polyisobutylene (PIB), ethylene propylene diene rubber (EPDM), isobutylene-isoprene rubber (IIR), isoprene rubber (IR), styrene-isoprene-butadiene rubber (SIBR), nitrile butadiene rubber (NBR), butadiene rubber (BR), acrylate rubber, silicone rubber, fluororubber, and a combination thereof.

4. The coated membrane of claim 1, wherein the ceramic micropowders comprise an oxide or nitride of an element selected from Al, Si, Zr, Mg, Ti, and B.

5. The coated membrane of claim 1, wherein the water-soluble polymer binder has a weight average molecular weight of more than 50,000, and is selected from the group consisting of carboxymethyl cellulose (CMC), polyvinyl pyrrolidone (PVP), polyoxyethylene, polyvinyl alcohol, an adduct of polypropylene glycol and ethylene oxide, and a combination thereof; the water-soluble polymer binder accounts for between 0.5 and 8 wt. % of the three components of the composite material-based microporous coating, particularly between 1 and 5 wt. %.

6. The coated membrane of claim 1, wherein the pre-crosslinked rubber particles, the ceramic micropowders, and the water-soluble polymer binder are mixed to yield an aqueous slurry, to which a non-ionic surface active agent accounting for 0-1 wt. % of the aqueous slurry is added prior to coating; the non-ionic surface active agent is selected from the group consisting of nonylphenol polyoxyethylene ether, octaphenyl polyoxythyiene, high carbon ($C_{12-22}$) fatty alcohol polyoxyethylene ether, an adduct of polypropylene glycol and ethylene oxide, a non-ionic fluorocarbon surfactant, and a combination thereof.

7. The coated membrane of claim 1, wherein the pre-crosslinked rubber particles, the ceramic micropowders, and the water-soluble polymer binder are mixed to yield an aqueous slurry, and a second solvent which is mixed with water and then wetted with polyethylene is added to the aqueous slurry prior to coating, a weight ratio of the aqueous slurry to the second solvent being between 100:0 and 100:50; the second slurry is selected from the group consisting of isopropanol, butanol, N-methylpyrrolidone, N-ethylpyrrolidone, N-octylpyrrolidone, polyethylene glycol and polypropylene glycol having a molecular weight of between 200 and 800, and a combination thereof.

8. The coated membrane of claim 1, wherein the PE-based microporous substrate comprises two layers of microporous membrane, a first layer is a polypropylene microporous membrane, and a second layer is a PE-based microporous membrane.

9. A lithium ion battery, comprising the coated membrane of any one of preceding claims 1-8, wherein the composite material-based microporous coating further comprises a second coating side, and the second coating side contacts a negative pole piece of the battery.

10. The coated membrane of claim 1, wherein an average pore size of the second substrate side is between 50 and 150 nm.

* * * * *